(12) United States Patent (10) Patent No.: US 8,325,308 B2
Nishimura et al. (45) Date of Patent: Dec. 4, 2012

(54) LIQUID CRYSTAL DISPLAY PANEL COMPRISING A DISPLAY SUB-PIXEL AND A VIEWING ANGLE CONTROL SUB-PIXEL WHEREIN A SLIT APERTURE IS INCLINED TO A DIRECTION OF THE RUBBING TREATMENT OF AN ALIGNMENT FILM

(75) Inventors: Joji Nishimura, Nagano (JP); Aya Yoso, Tottori (JP); Shintaro Hama, Tottori (JP)

(73) Assignee: Sony Corporation, Tokyo (JP)

( * ) Notice: Subject to any disclaimer, the term of this patent is extended or adjusted under 35 U.S.C. 154(b) by 203 days.

(21) Appl. No.: 12/944,277

(22) Filed: Nov. 11, 2010

(65) Prior Publication Data

US 2011/0122342 A1 May 26, 2011

(30) Foreign Application Priority Data

Nov. 25, 2009 (JP) ................................ P2009-267165

(51) Int. Cl.
*G02F 1/1343* (2006.01)
*G02F 1/1337* (2006.01)
(52) U.S. Cl. ...................... 349/144; 349/142; 349/126
(58) Field of Classification Search .......... 349/123–130, 349/141–143
See application file for complete search history.

(56) References Cited

U.S. PATENT DOCUMENTS

| 2007/0165174 | A1 | 7/2007 | Kazuyoshi et al. |
| 2008/0143930 | A1* | 6/2008 | Jin et al. ........................... 349/96 |
| 2008/0291223 | A1* | 11/2008 | Yamazaki et al. ............ 345/690 |
| 2009/0231530 | A1 | 9/2009 | Nishimura |
| 2009/0303420 | A1* | 12/2009 | Kim et al. ....................... 349/96 |
| 2010/0128208 | A1* | 5/2010 | Kurasawa ....................... 349/106 |

FOREIGN PATENT DOCUMENTS

| JP | 5-108023 | 4/1993 |
| JP | 2007-178737 | 7/2007 |
| JP | 2009-222747 | 10/2009 |

* cited by examiner

*Primary Examiner* — Mark Robinson
*Assistant Examiner* — Paul Lee
(74) *Attorney, Agent, or Firm* — K&L Gates LLP

(57) ABSTRACT

Disclosed herein is a liquid crystal display panel including: first substrate and second substrate configured to sandwich a liquid crystal layer and be disposed opposed to each other, a display sub-pixel and a viewing angle control sub-pixel being formed in the first substrate and the second substrate; a first polarizer configured to be provided on an outer surface side of the first substrate; and a second polarizer configured to be provided on an outer surface side of the second substrate and have an optical axis perpendicular to an optical axis of the first polarizer.

5 Claims, 7 Drawing Sheets

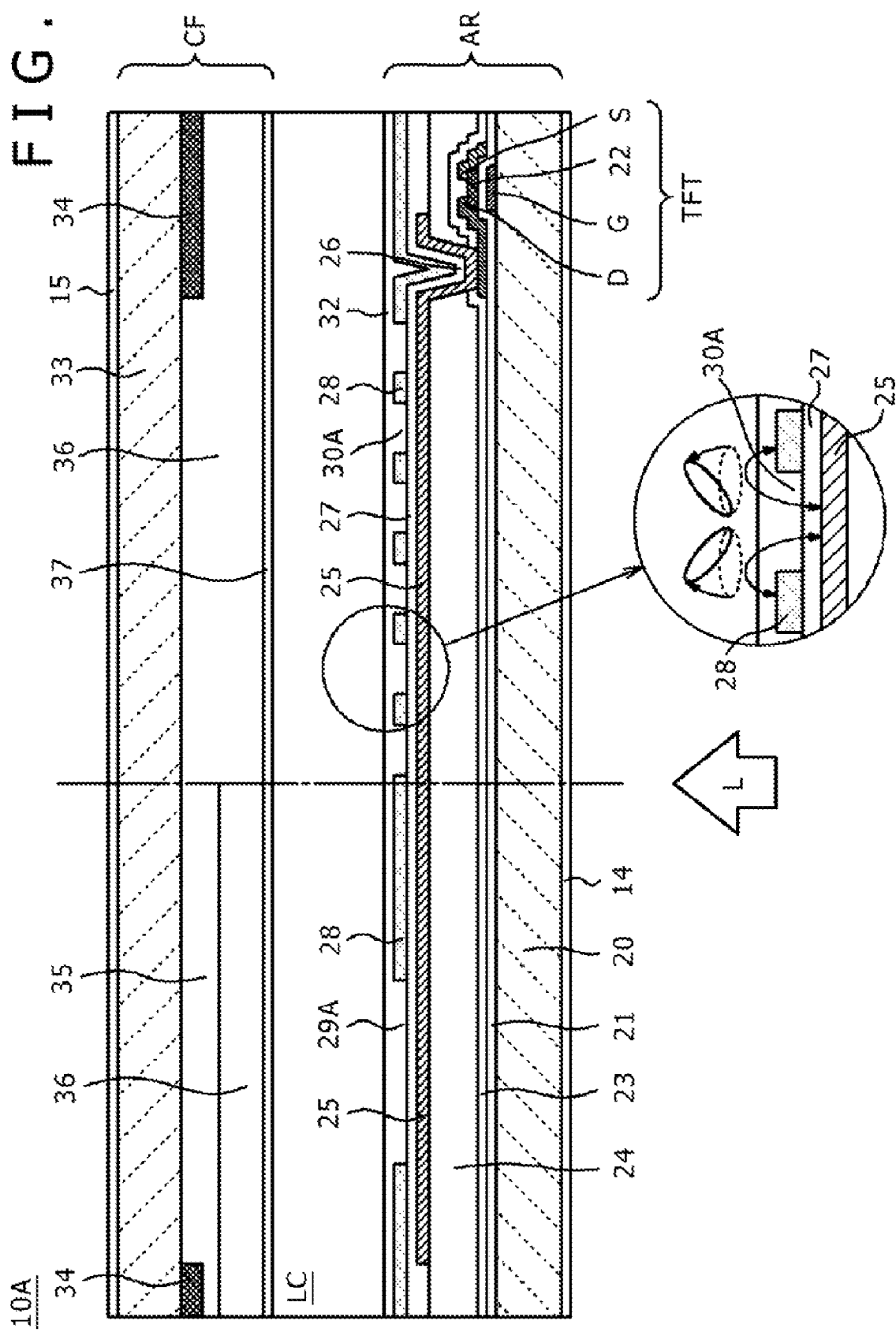

LIQUID CRYSTAL DISPLAY PANEL COMPRISING A DISPLAY SUB-PIXEL AND A VIEWING ANGLE CONTROL SUB-PIXEL WHEREIN A SLIT APERTURE IS INCLINED TO A DIRECTION OF THE RUBBING TREATMENT OF AN ALIGNMENT FILM

CROSS REFERENCES TO RELATED APPLICATIONS

The present application claims priority to Japanese Priority Patent Application JP 2009-267165 filed in the Japan Patent Office on Nov. 25, 2009, the entire content of which is hereby incorporated by reference.

BACKGROUND

The present application relates to a liquid crystal display panel including a viewing angle control sub-pixel, and particularly to a liquid crystal display panel in which a viewing angle control sub-pixel operates in the FFS mode.

The liquid crystal display panel has features of lighter weight, smaller thickness, and lower power consumption compared with the cathode ray tube (CRT) and therefore is used as a display unit in many electronic apparatuses. The liquid crystal display panel is to display an image by changing the orientation of liquid crystal molecules aligned along a predetermined direction by an electric field to thereby change the amount of light passing through the liquid crystal layer. Among such liquid crystal display panels are a reflective display panel in which ambient light is incident on the liquid crystal layer and is reflected by a reflective plate to pass through the liquid crystal layer again and be output, a transmissive display panel in which incident light from a backlight device passes through the liquid crystal layer, and a semi-transmissive display panel having the characteristics of both the reflective display panel and the transmissive display panel.

As the method for applying the electric field to the liquid crystal layer of the liquid crystal display panel, a method of the vertical electric field system and a method of the transverse electric field system are known. In the liquid crystal display panel of the vertical electric field system, an electric field along substantially the vertical direction is applied to liquid crystal molecules by a pair of electrodes sandwiching the liquid crystal layer. As the liquid crystal display panel of this vertical electric field system, display panels of the twisted nematic (TN) mode, the vertical alignment (VA) mode, the multi-domain vertical alignment (MVA) mode, etc. are known. In the liquid crystal display panel of the transverse electric field system, a pair of electrodes insulated from each other are provided on the internal surface side of one of a pair of substrates sandwiching the liquid crystal layer, and an electric field along substantially the lateral direction is applied to liquid crystal molecules. As the liquid crystal display panel of this transverse electric field system, a display panel of the in-plane switching (IPS) mode, in which the pair of electrodes do not overlap with each other in plan view, and a display panel of the fringe field switching (FFS) mode, in which the pair of electrodes overlap with each other in plan view, are known.

In the IPS-mode liquid crystal display panel, the pair of electrodes as a pixel electrode and a common electrode are formed into a comb-teeth shape so that they may be interdigitated with each other, in such a state as to be electrically insulated from each other, and an electric field along the lateral direction is applied to the liquid crystal between the pixel electrode and the common electrode. This IPS-mode liquid crystal display device has an advantage that the viewing angle is wider than that of the liquid crystal display device of the vertical electric field system.

In the FFS-mode liquid crystal display panel, the pair of electrodes as an upper electrode and a lower electrode are disposed in layers different from each other with the intermediary of an insulating film. Furthermore, slit apertures are provided in the upper electrode and an electric field along substantially the lateral direction passing through the slit aperture is applied to the liquid crystal layer. This FFS-mode liquid crystal display panel is increasingly used in recent years because it has an advantage that a wide viewing angle can be obtained and the image contrast can be improved.

As described above, the liquid crystal display panel of the transverse electric field system has a wide viewing angle. However, when confidential information that is not desired to be seen is displayed, it is preferable to employ a small viewing angle to prevent others from having visual contact with the displayed information. Therefore, as shown in Japanese Patent Laid-open No. Hei 5-108023 (hereinafter, Patent Document 1), there has been known a method of adding a liquid crystal panel for viewing angle control to a liquid crystal panel for displaying and controlling the viewing angle characteristics.

However, this method has a problem that the addition of the panel for viewing angle control greatly increases the thickness of the liquid crystal display panel. As a solution to this problem, as shown in Japanese Patent Laid-open No. 2007-178737 (hereinafter, Patent Document 2) and Japanese Patent Laid-open No. 2009-222747 (hereinafter, Patent Document 3), there has been known a method of adding a viewing angle control sub-pixel in addition to display sub-pixels of red (R), green (G), and blue (B) and controlling the viewing angle characteristics by controlling the voltage applied to the viewing angle control sub-pixel.

With use of FIGS. 7A and 7B, a description will be made below about the configuration of an FFS-mode liquid crystal display panel to which the viewing angle control sub-pixel disclosed in Patent Documents 2 and 3 is added. FIG. 7A is a plan view showing the outline of the array substrate corresponding to one pixel in the FFS-mode liquid crystal display panel to which the viewing angle control sub-pixel of the related arts is added. FIG. 7B is a diagram showing the alignment state of liquid crystal molecules in the viewing angle control sub-pixel.

As shown in FIG. 7A, one pixel 11D of a liquid crystal display panel 10D is composed of a display area 12D and a viewing angle control area 13D disposed adjacent to the display area 12D. The display area 12D is composed of display sub-pixels 16D of three colors of R, G, and B, and the color of the pixel is defined by color mixing of light of these colors. The viewing angle control area 13D includes one viewing angle control sub-pixel 17D. An upper electrode 28 of the liquid crystal display panel 10D operates as the common electrode in this configuration and is formed across all the pixels. A lower electrode 25 operates as the pixel electrode and is formed for each of the display sub-pixels 16D and the viewing angle control sub-pixels 17D.

First slit apertures 29D having a bent shape are formed in the upper electrode 28 in the display area 12D. An alignment film (not shown) is formed on the surface of this upper electrode 28 and the inner surfaces of the slit apertures 29D. For this alignment film, rubbing treatment in the same direction as the extending direction of a signal line 19 (Y-axis direction in FIG. 7A) is performed. The first slit aperture 29D is composed of a first sub-slit aperture 38 inclined to the direction of the rubbing treatment by +6α and a second sub-slit aperture 39 inclined by −6α. In the upper electrode 28 in the viewing angle control area 13D, second slit apertures 30D extended along the direction perpendicular to the direction of the rubbing treatment are formed.

In this liquid crystal display panel 10D, as shown in FIG. 5 in Patent Document 3, liquid crystal molecules in the viewing angle control area 13D are inclined to the surface of the array substrate when a drive voltage is applied between the upper electrode 28 and the lower electrode 25. Therefore, although there is no influence of viewing angle control in the direction of direct viewing of the front face of the liquid crystal display panel 10D, the contrast is lowered due to light leakage and thus viewing the displayed image is difficult in an oblique viewing direction. Consequently, the viewing angle control effect can be exerted.

However, in the liquid crystal display panel 10D of the related arts, the extending direction of the second slit apertures 30D in the viewing angle control area 13D is at a right angle to the direction RD of the rubbing treatment. Thus, as shown in FIG. 7B, when liquid crystal molecules at the center part of the second slit aperture 30D rotate, the direction of the rotation is not settled, which leads to a problem that disclination is generated when viewing angle control is carried out and light leakage occurs also along the direct viewing direction. This light leakage along the direct viewing direction can be suppressed tentatively by blocking light from the center part of the slit by a black matrix. However, in this case, light from the part that effectively has the viewing angle control function originally is also blocked and thus the viewing angle control function is also lowered.

SUMMARY

There is a need for the present application to provide a liquid crystal display panel in which light leakage along the direct viewing direction is reduced when viewing angle control is carried out and the viewing angle control function is favorable, as a liquid crystal display panel including a viewing angle control sub-pixel of the FFS mode.

According to an embodiment, there is provided a liquid crystal display panel including first substrate and second substrate configured to sandwich a liquid crystal layer and be disposed opposed to each other. A display sub-pixel and a viewing angle control sub-pixel are formed in the first substrate and the second substrate. The liquid crystal display panel further includes a first polarizer configured to be provided on the outer surface side of the first substrate, and a second polarizer configured to be provided on the outer surface side of the second substrate and have the optical axis perpendicular to the optical axis of the first polarizer. In the first substrate, for both the display sub-pixel and the viewing angle control sub-pixel, a lower electrode, an upper electrode that is formed with the intermediary of an insulating layer between the upper electrode and the lower electrode and has a plurality of slit apertures, and a first alignment film that is formed on a surface of the upper electrode and in the slit apertures and is subjected to rubbing treatment parallel or perpendicular to the optical axis of the first polarizer are formed. In the second substrate, a second alignment film subjected to rubbing treatment parallel or perpendicular to the optical axis of the first polarizer is formed. The direction of the rubbing treatment for the first alignment film is inclined to at least one of the perpendicular line to the extending direction of the slit aperture of the viewing angle control sub-pixel and the edge line of a slit end part of the slit aperture of the viewing angle control sub-pixel.

If the direction of the rubbing treatment for the first alignment film is inclined to the perpendicular line to the extending direction of the slit aperture of the viewing angle control sub-pixel, when viewing angle control is carried out, liquid crystal molecules at the center of the slit aperture rotate in the same direction and are aligned along the same direction. Thus, disclination hardly occurs at the center part of the slit aperture, and light leakage along the direct viewing direction can be suppressed. This light leakage suppression effect is achieved similarly also at the slit end part, and it is preferable that the direction of the rubbing treatment for the first alignment film be inclined to the edge line of the slit end part of the slit aperture of the viewing angle control sub-pixel. So, in the liquid crystal display panel of the embodiment, the direction of the rubbing treatment for the first alignment film is set to such a state as to be inclined to at least one of the perpendicular line to the extending direction of the slit aperture of the viewing angle control sub-pixel and the edge line of the slit end part of the slit aperture of the viewing angle control sub-pixel. Therefore, according to the liquid crystal display panel of the embodiment, when viewing angle control is carried out, light leakage hardly occurs along the direct viewing direction. In contrast, light leakage occurs along oblique directions, and the contrast when the display panel is viewed from an oblique side is lowered. This provides an FFS-mode liquid crystal display panel capable of intentionally narrowing the viewing angle for confidentiality while keeping favorable contrast in the direct viewing direction. When viewing angle control is not carried out, the viewing angle control sub-pixel has no influence on the displaying quality because it operates in the normally black mode.

In the liquid crystal display panel of the embodiment, it is preferable that the direction of the rubbing treatment for the first alignment film be inclined to the perpendicular line to the extending direction of the slit aperture of the viewing angle control sub-pixel by 0.1° to 5°.

If the angle of the inclination to the perpendicular line to the extending direction of the slit aperture is set large, disclination hardly occurs but the viewing angle control effect is lowered. According to experiments by the present inventors and so forth, when this inclination angle is set to 0.1° to 5°, the lowering of the viewing angle control effect can be reduced. In addition, light leakage along the direct viewing direction due to uneven alignment of liquid crystal molecules located at the center part of the slit aperture of the viewing angle control sub-pixel can be reduced. If this inclination angle is smaller than 0.1°, the extent of generation of disclination is large. Furthermore, the extent of light leakage along the direct viewing direction is large and thus the contrast in the direct viewing direction is lowered. Therefore, such a small inclination angle is not preferable. If this inclination angle surpasses 5°, although light leakage due to disclination is absent, light leakage due to the occurrence of a twist in a certain direction becomes a problem. Therefore, such a large inclination angle is not preferable.

In the liquid crystal display panel of the embodiment, it is preferable that the plurality of slit apertures of the display sub-pixel have a vertical bent shape along a signal line.

In an FFS-mode liquid crystal display panel, if the plurality of slit apertures of the display sub-pixel are formed into a vertical bent shape along the signal line, the number of both end parts of the slit apertures, which are an abnormal alignment area, is decreased and thus the lowering of the aperture ratio is suppressed, because the display sub-pixel is vertically long normally. Furthermore, if the slit aperture is formed into a bent shape, the rotation of liquid crystal molecules in one direction in a unified manner is absent. Thus, apparent retardation dependent on the viewing direction does not change, and change in the color dependent on the viewing direction is absent. Therefore, according to the liquid crystal display panel of the embodiment, an FFS-mode liquid crystal display panel having a high aperture ratio and favorable displaying quality and viewing angle control characteristics is achieved. In this case, the rubbing treatment direction is inclined to the signal line, or the extending direction of the slit aperture of the viewing angle control sub-pixel is inclined to the scan line.

In the liquid crystal display panel of the embodiment, the direction of the rubbing treatment for the first alignment film may be parallel to a signal line or a scan line.

According to the liquid crystal display panel of the embodiment, particularly when the optimum rubbing treatment direction for the display sub-pixel is parallel to the signal line or the scan line, such as when the display sub-pixel has a slit having a bent shape, the optimum rubbing treatment direction for the display sub-pixel can be kept by inclining the extending direction of the slit aperture of the viewing angle control sub-pixel to the scan line or the signal line. This provides an FFS-mode liquid crystal display panel having a high aperture ratio and favorable displaying quality and viewing angle control characteristics.

In the liquid crystal display panel of the embodiment, the plurality of slit apertures of the display sub-pixel may be extended along the lateral direction with an inclination to a scan line in one direction, and the plurality of slit apertures of the viewing angle control sub-pixel may be extended along the vertical direction in parallel to the extending direction of a signal line.

Among FFS-mode liquid crystal display panels is a display panel in which the plurality of slit apertures of the sub-pixel in the display area are extended along the lateral direction with an inclination to the scan line in one direction. According to the liquid crystal display panel of the embodiment, the plurality of slit apertures of the viewing angle control sub-pixel are extended along the vertical direction in parallel to the extending direction of the signal line. Thus, favorable displaying quality and viewing angle control characteristics are achieved also in the FFS-mode liquid crystal display panel in which the plurality of slit apertures of the sub-pixel in the display area are extended along the lateral direction with an inclination to the scan line in one direction.

Additional features and advantages are described herein, and will be apparent from the following Detailed Description and the figures.

BRIEF DESCRIPTION OF THE FIGURES

FIG. 2 is a sectional view along line II-II in FIG. 1 in the first embodiment;

DETAILED DESCRIPTION

Figure 1:
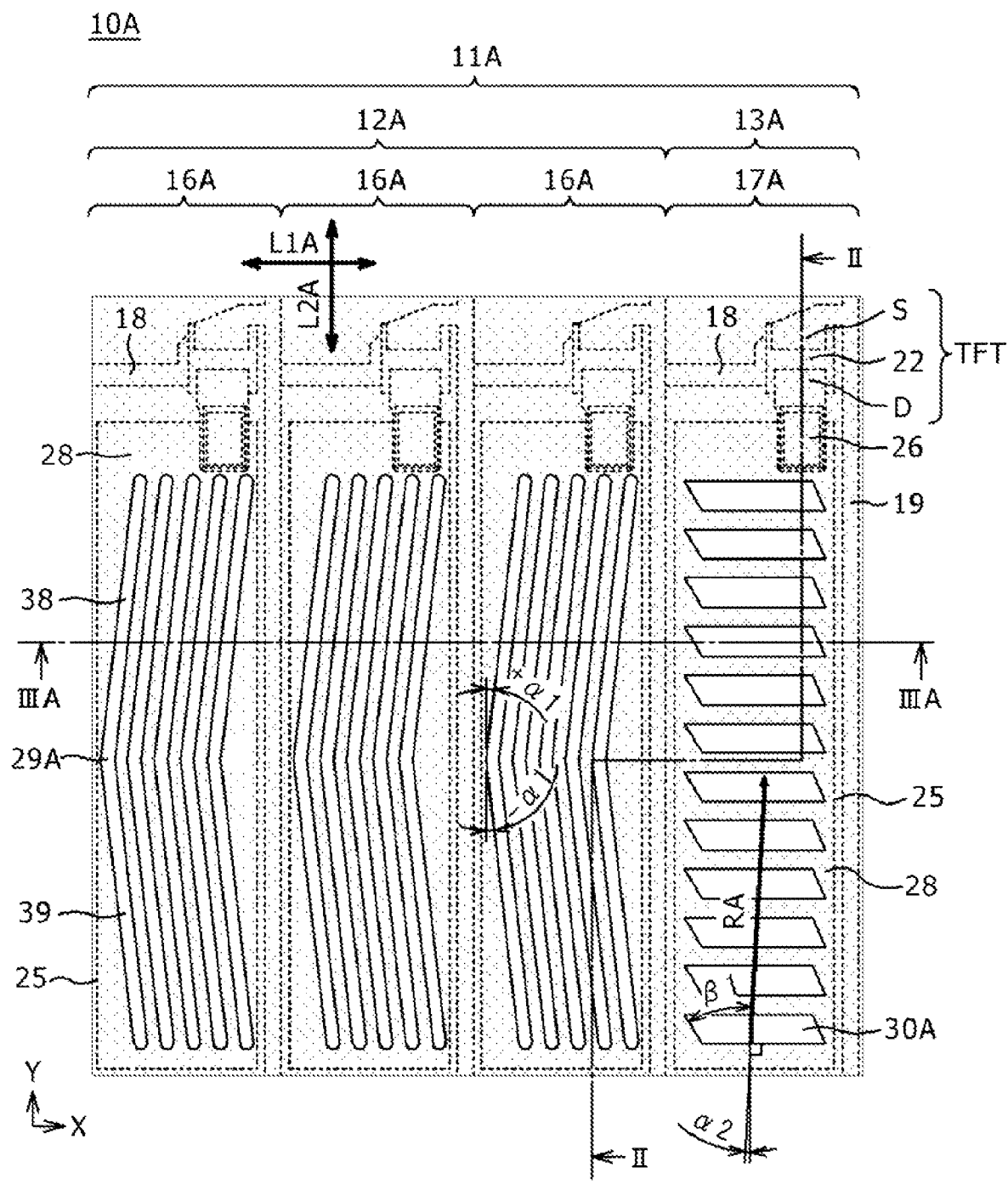
FIG. 1 is a plan view showing the outline of an array substrate corresponding to one pixel in a first embodiment.

Modes for carrying out the present application will be described below with reference to an embodiment and the drawings. The embodiments shown below do not intend to limit the present application to the description of the embodiments, but the present application can be evenly applied to techniques obtained by making various changes without departing from the technical idea shown in the scope of claims. Furthermore, in the respective drawings used for the description in the present specification, the respective layers and the respective members are so represented that the scale is changed for each layer and each member so that the respective layers and the respective members may have such sizes as to be recognizable in the drawings, and they are not necessarily represented in proportion to the actual dimensions.

First Embodiment

Figure 3A:
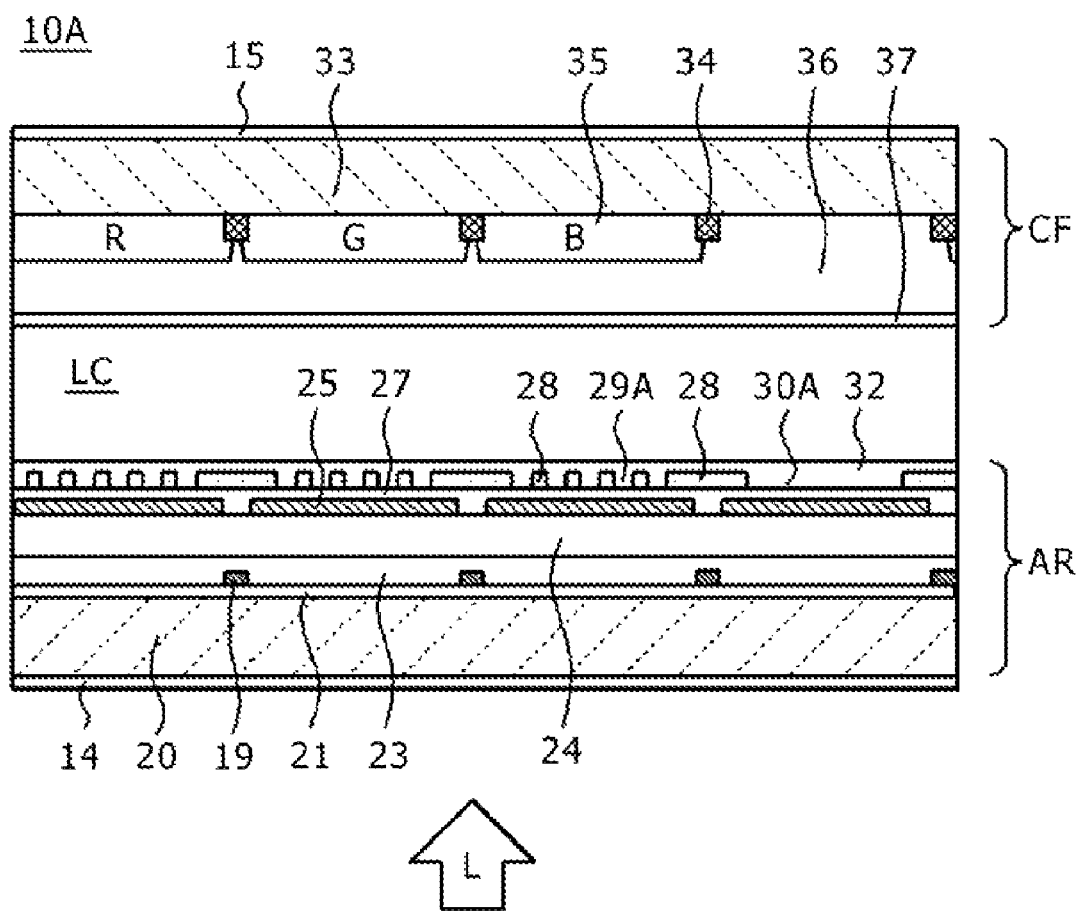
FIG. 3A is a sectional view along line IIIA-IIIA in FIG. 1 in the first embodiment.

The configuration of the major part of a liquid crystal display panel 10A of a first embodiment will be described with use of FIGS. 1 to 3B. In FIG. 1, diagrammatic representation of a first alignment film is omitted. In the liquid crystal display panel 10A of the first embodiment, each pixel 11A includes a display area 12A of the FFS mode for color displaying and a viewing angle control area 13A of the FFS mode. As shown in FIG. 2 and FIG. 3A, in the liquid crystal display panel 10A, a liquid crystal layer LC is sandwiched by an array substrate AR and a color filter substrate CF. A first polarizer 14 is provided on the outer surface of the array substrate AR on the opposite side to the liquid crystal layer LC, and a second polarizer 15 is provided on the outer surface of the color filter substrate CF on the opposite side to the liquid crystal layer LC. In the liquid crystal display panel 10A of the first embodiment, the first polarizer 14 and the second polarizer 15 are disposed in a crossed Nicols state, and thus the liquid crystal display panel 10A operates in the normally black mode.

The liquid crystal display panel 10A has the plural pixels 11A arranged along the row direction (X-axis direction in FIG. 1) and the column direction (Y-axis direction in FIG. 1). As shown in FIG. 1, one pixel 11A is composed of the display area 12A and the viewing angle control area 13A disposed adjacent to the display area 12A. The display area 12A is composed of display sub-pixels 16A for displaying three colors of red (R), green (G), and blue (B) for example, and the color of the pixel is defined by color mixing of light of these colors. The viewing angle control area 13A includes one viewing angle control sub-pixel 17A.

Each of the display sub-pixels 16A and the viewing angle control sub-pixel 17A of the array substrate AR is provided with a scan line 18 that is extended along the row direction and composed of an opaque metal such as aluminum or molybdenum, a signal line 19 that is extended along the column direction and composed of an opaque metal such as aluminum or molybdenum, and a thin film transistor TFT disposed near the intersection of the scan line 18 and the signal line 19. The thin film transistor TFT of the display sub-pixel 16A and the thin film transistor TFT of the viewing angle control sub-pixel 17A have the same configuration.

The base of the array substrate AR is a first transparent substrate 20 composed of glass, quartz, plastic, or the like that is transparent and has the insulating characteristic. The scan line 18 is formed on the first transparent substrate 20 on the side opposed to the liquid crystal layer LC, and a gate electrode G is extended from the scan line 18. A transparent gate insulating film 21 composed of a silicon nitride, a silicon oxide, or the like is so stacked as to cover the scan line 18 and the gate electrode G. On the gate insulating film 21 overlapping with the gate electrode G in plan view, a semiconductor layer 22 composed of amorphous silicon, polycrystalline silicon, or the like is formed. The plural signal lines 19 composed of a metal such as aluminum or molybdenum are formed on the gate insulating film 21 along the column direction. Each of the areas segmented by these scan lines 18 and signal lines 19 serves as the sub-pixel area. A source electrode S is extended from this signal line 19, and this source electrode S is partially in contact with the surface of the semiconductor layer 22.

A drain electrode D that is formed by using the same material as that of the signal line 19 simultaneously with the signal line 19 is provided on the gate insulating film 21. This drain electrode D is disposed near the source electrode S and partially in contact with the surface of the semiconductor layer 22. The display area 12A having a substantially square shape in one pixel 11A is configured by three display sub-pixels 16A of R, G, and B. Therefore, each display sub-pixel 16A trisecting this display area 12A is a rectangle that has the shorter side along the scan line 18 and has the longer side along the signal line 19. The thin film transistor TFT serving as a switching element is configured by the gate electrode G, the gate insulating film 21, the semiconductor layer 22, the source electrode S, and the drain electrode D.

A transparent passivation film 23 composed of e.g. a silicon nitride or a silicon oxide is so stacked as to cover the signal line 19, the thin film transistor TFT, and the exposed part of the gate insulating film 21. An interlayer resin film 24 composed of a transparent resin material such as a photoresist is so stacked as to cover the passivation film 23. The interlayer resin film 24 planarizes the uneven surface of the passivation film 23 due to the signal line 19, the thin film transistor TFT, and the gate insulating film 21. A lower electrode 25 composed of a transparent electrically-conductive material such as indium tin oxide (ITO) or indium zinc oxide (IZO) is so formed as to cover the interlayer resin film 24. A contact hole 26 that penetrates the interlayer resin film 24 and the passivation film 23 to reach the drain electrode D is formed, and the lower electrode 25 and the drain electrode D are electrically connected to each other via this contact hole 26. Thus, the lower electrode 25 operates as the pixel electrode.

A transparent inter-electrode insulating film 27 composed of e.g. a silicon nitride or a silicon oxide is so stacked as to cover the lower electrode 25. An upper electrode 28 composed of a transparent electrically-conductive material such as ITO or IZO is so formed as to cover the inter-electrode insulating film 27. The upper electrode 28 is formed across the respective pixels 11A and electrically connected to a common interconnect (not shown). Thus, the upper electrode 28 operates as the common electrode.

As shown in FIG. 1, plural first slit apertures 29A are formed in the upper electrode 28 of the display sub-pixel 16A, and plural second slit apertures 30A are formed in the upper electrode 28 of the viewing angle control sub-pixel 17A. These slit apertures 29A and 30A are formed by performing exposure and development of a photoresist material applied on the surface of the upper electrode 28 by a photolithography method and then performing etching. A first alignment film 32 composed of e.g. polyimide is so stacked as to cover the upper electrode 28 and the inner surfaces of the slit apertures 29A and 30A. Rubbing treatment is performed for the first alignment film 32. When an electric field is not applied to the liquid crystal layer LC, liquid crystal molecules are aligned along the direction of the rubbing treatment.

The base of the color filter substrate CF is a second transparent substrate 33 composed of glass, quartz, plastic, or the like that is transparent and has the insulating characteristic. On the surface of the second transparent substrate 33 closer to the liquid crystal layer LC, a light-blocking layer 34 is formed at the position opposed to the scan line 18, the signal line 19, and the thin film transistor TFT, which are opaque members of the array substrate AR. Color filter layers 35 through which light of colors different from each other (R, G, B) can pass are formed for three display sub-pixels 16A. As shown in FIG. 3A, the color filter layer 35 is not formed for the viewing angle control sub-pixel 17A.

An overcoat layer 36 composed of a transparent resin material such as a photoresist is so stacked as to cover the light-blocking layer 34 and the color filter layers 35. The overcoat layer 36 of the color filter substrate CF is formed in order to planarize steps due to the color filter layers 35 of the different colors and block impurities from the light-blocking layer 34 and the color filter layers 35 so that the impurities may be prevented from entering the liquid crystal layer LC. A second alignment film 37 composed of e.g. polyimide is so formed as to cover the overcoat layer 36. Rubbing treatment is performed also for this second alignment film 37.

Detailed descriptions will be made below about the first slit aperture 29A in the upper electrode 28 of the display sub-pixel 16A, the second slit aperture 30A in the upper electrode 28 of the viewing angle control sub-pixel 17A, and the direction of the rubbing treatment. As shown in FIG. 1, the first slit aperture 29A is formed into a bent shape extended along the extending direction of the signal line 19. Because the display sub-pixel 16A is vertically long, the number of both ends of the first slit apertures 29A becomes large if the first slit apertures 29A are extended along the lateral direction. The end part of the first slit aperture 29A is the area of abnormal alignment of liquid crystal molecules. So, in the liquid crystal display panel 10A of the first embodiment, the extending direction of the first slit aperture 29A is set to the vertical direction to thereby decrease the number of end parts of the first slit apertures 29A and reduce the lowering of the aperture ratio.

The first slit aperture 29A having a bent shape is composed of a first sub-slit aperture 38 inclined to the extending direction of the signal line 19 by $+\alpha 1$ (the clockwise direction is defined as the positive direction and $\alpha 1$ is defined as a positive value) and a second sub-slit aperture 39 inclined by $-\alpha 1$. Although $\alpha 1$ differs depending on various conditions, it is preferable that $\alpha 1$ be 3° to 15°. If all the first slit apertures 29A are inclined to the direction of the rubbing treatment in the clockwise direction or the counterclockwise direction, liquid crystal molecules rotate in one direction and thus a phenomenon in which the color changes depending on the viewing direction appears. This is because apparent retardation changes depending on the direction along which the liquid crystal molecules are seen. In this configuration, 5°, which is close to the optimum value, is employed as $\alpha 1$. The second slit aperture 30A is so formed as to be extended in parallel to the extending direction of the scan line 18 as shown in FIG. 1. The shorter sides of the second slit aperture 30A are so formed as to be diagonally right down slightly.

Figure 3B:
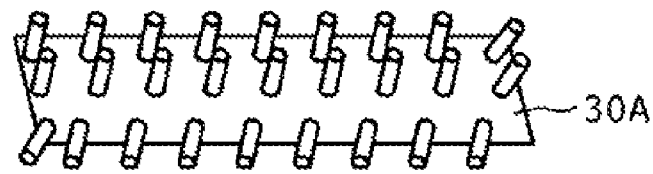
FIG. 3B is a plan view showing the alignment of liquid crystal molecules in a slit aperture of a viewing angle control sub-pixel in the first embodiment.

In the liquid crystal display panel of the related-art example, in which slit apertures having a vertical bent shape are formed, the direction of the rubbing treatment for the alignment film formed in the array substrate and the direction of the rubbing treatment for the alignment film formed in the color filter substrate are both the same as the extending direction of the signal line and are opposite to each other. However, in the liquid crystal display panel 10A of the first embodiment, the direction RA of the rubbing treatment for the first alignment film 32 is inclined by α2 to the perpendicular line to the extending direction of the second slit aperture 30A, i.e. to the direction of the electric field at the longer-side part of the second slit aperture 30A. From various experimental results by the present inventors and so forth, as α2, a value in the range of 0.1° to 5° is employed as a preferable value. Therefore, as shown in FIG. 3B, liquid crystal molecules at the center part of the second slit aperture 30A rotate in the same direction as that of liquid crystal molecules at the boundary part of the second slit aperture 30A. Thus, disclination hardly occurs and light leakage hardly occurs. Although the inclination direction of the direction RA of the rubbing treatment is the clockwise direction in FIG. 1, the inclination direction may be the counterclockwise direction.

As shown in FIG. 1, the edge lines of the slit end parts of the second slit aperture 30A are not parallel to the direction RA of the rubbing treatment but inclined by β1. Therefore, liquid crystal molecules rotate in the same direction also at the center part of the edge line of the slit end part. Thus, disclination hardly occurs and light leakage hardly occurs.

The array substrate AR and the color filter substrate CF formed in the above-described manner are made to be opposed to each other, and a seal material (not shown) is provided around both substrates to thereby bond both substrates to each other. Subsequently, a liquid crystal is packed between both substrates, whereby the liquid crystal display panel 10A of the first embodiment is achieved. This liquid crystal display panel 10A operates in the normally black mode. As shown in FIG. 1, the optical axis (transmission axis) L1A of the first polarizer 14 of the array substrate AR is parallel to the scan line 18, and the optical axis L2A of the second polarizer 15 of the color filter substrate CF is parallel to the signal line 19. Incident light L is emitted from a backlight unit (not shown) disposed on the back side of the liquid crystal display panel 10A (see FIG. 2 and FIG. 3A).

In the display area 12A, when the thin film transistor TFT is in the OFF-state, the incident light converted to linearly polarized light parallel to the scan line 18 by the first polarizer 14 is incident on the second polarizer 15 as it is. Thus, the incident light cannot pass through the liquid crystal display panel 10A, so that black is displayed. If the thin film transistor TFT enters the ON-state, an electric field is generated between the lower electrode 25 and the upper electrode 28 and the alignment of liquid crystal molecules in the liquid crystal layer LC changes, which gives a predetermined phase difference (½ wavelength) to the light passing through the liquid crystal layer LC. Thus, the incident light converted to the linearly polarized light parallel to the scan line 18 by the first polarizer 14 is incident on the second polarizer 15 after the phase thereof is changed by 90°. Thus, the incident light can pass through the liquid crystal display panel 10A and a chromatic color can be displayed by the color filter layer 35.

When the thin film transistor TFT is in the OFF-state, liquid crystal molecules located in the second slit aperture 30A of the viewing angle control sub-pixel 17A are parallel to the surface of the array substrate AR. Therefore, light is leaked neither along the direction toward the front side of the liquid crystal display panel 10A nor along directions toward oblique sides. Thus, no influence is given to displaying in the display area 12A. If the thin film transistor TFT enters the ON-state, an electric field is generated between the lower electrode 25 and the upper electrode 28. Thus, as shown in the enlarged diagram in FIG. 2 and FIG. 3B, liquid crystal molecules located in the second slit aperture 30A of the viewing angle control sub-pixel 17A are inclined to the surface of the array substrate AR. Therefore, the incident light from the backlight source is leaked out along the inclination direction. Consequently, although no influence is given to the displaying on the front side of the liquid crystal display panel 10A, the contrast is lowered and viewing the image becomes difficult in an oblique viewing direction of the liquid crystal display panel 10A.

Second Embodiment

Figure 4:
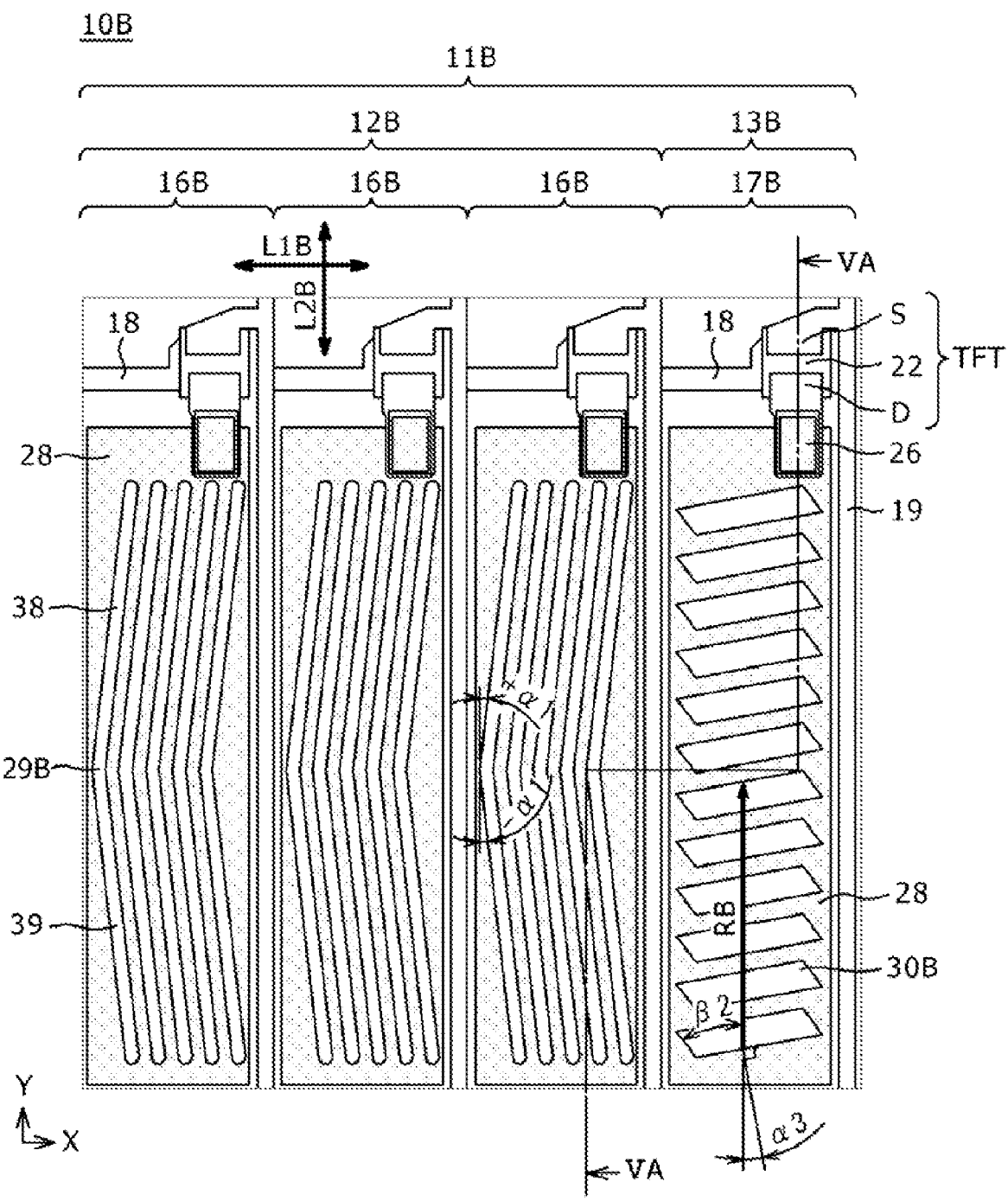
FIG. 4 is a plan view showing the outline of an array substrate corresponding to one pixel in a second embodiment.
Figure 5A:
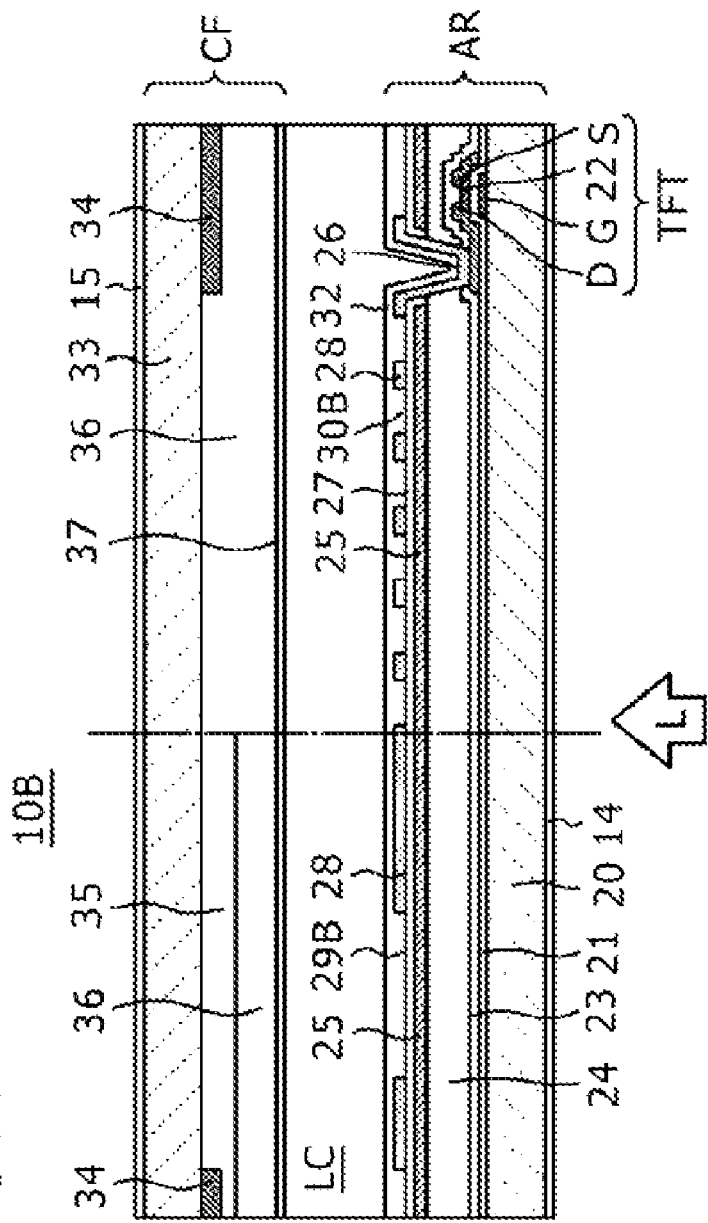
FIG. 5A is a sectional view along line VA-VA in FIG. 4 in the second embodiment.
Figure 5B:
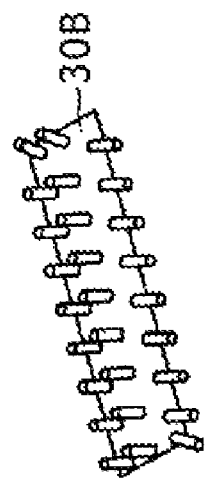
FIG. 5B is a plan view showing the alignment of liquid crystal molecules in a slit aperture of a viewing angle control sub-pixel in the second embodiment.

A liquid crystal display panel 10B of a second embodiment will be described below with use of FIG. 4 to FIG. 5B. In FIG. 4, diagrammatic representation of the first alignment film is omitted. FIG. 4 corresponds to FIG. 1 for the liquid crystal display panel 10A of the first embodiment. FIG. 5A corresponds to FIG. 2, and FIG. 5B corresponds to FIG. 3B. For the liquid crystal display panel 10B of the second embodiment, the part having the same configuration as that of the part in the liquid crystal display panel 10A of the first embodiment is given the same reference numeral, and the alphabet is changed to "B" for the reference numeral having the alphabet. Detailed description of these parts is omitted. Main differences in the configuration between the liquid crystal display panel 10B of the second embodiment and the liquid crystal display panel 10A of the first embodiment are the extending direction of the slit apertures of the viewing angle control sub-pixel, the direction of the rubbing direction, and the operation of the upper electrode and the lower electrode.

In the liquid crystal display panel 10A of the first embodiment, the upper electrode 28 operates as the common electrode and the lower electrode 25 operates as the pixel electrode. In contrast, in the liquid crystal display panel 10B of the second embodiment, the upper electrode 28 is electrically connected to the drain electrode of the thin film transistor TFT as shown in FIG. 5A and thus operates as the pixel electrode, and the lower electrode 25 operates as the common electrode. Also in the FFS-mode liquid crystal display panel in which the operating state of the upper electrode and the lower electrode is reverse in this manner, an electric field is generated between the lower electrode 25 and the upper electrode 28 if the thin film transistor TFT enters the ON-state. Thus, as shown in FIG. 5B, liquid crystal molecules located in the second slit aperture 30B of the viewing angle control sub-pixel 17B are inclined to the surface of the array substrate AR. Therefore, light is leaked along the inclination direction.

In the liquid crystal display panel 10A of the first embodiment, the direction RA of the rubbing treatment for the first alignment film 32 is inclined to the signal line 19 by α2. In contrast, in the liquid crystal display panel 10B of the second embodiment, the direction RB of the rubbing treatment for the first alignment film 32 is parallel to the signal line 19 as shown in FIG. 4. Thus, the extending direction of the first sub-slit aperture 38 of the slit aperture 29B and the extending direction of the second sub-slit aperture 39 are inclined to the direction of the rubbing treatment by +α1 and −α1, respectively. The absolute values of these inclination angles are both α1. In this configuration, 5°, which is close to the optimum value, is set as this α1.

In the liquid crystal display panel 10A of the first embodiment, the second slit aperture 30A of the viewing angle control sub-pixel 17A is extended along the same direction as that of the scan line 18. In contrast, in the liquid crystal display panel 10B of the second embodiment, the second slit aperture 30B of the viewing angle control sub-pixel 17B is so extended as to be inclined to the scan line 18 by α3. Furthermore, the direction RB of the rubbing treatment in the liquid crystal display panel 10B of the second embodiment is parallel to the signal line 19. Therefore, the perpendicular line to the extending direction of the second slit aperture 30B is inclined to the direction RB of the rubbing treatment by α3.

In the liquid crystal display panel 10A of the first embodiment, if the inclination angle α2 between the perpendicular line to the extending direction of the second slit aperture 30A and the direction RA of the rubbing treatment is set large, the difference becomes large between the inclination angle α1−α2 of the extending direction of the first sub-slit aperture 38 to the direction RA of the rubbing treatment and the inclination angle α1+α2 of the extending direction of the second sub-slit aperture 39 to the direction RA of the rubbing treatment. Thus, the setting of α2 involves restrictions. However, in the liquid crystal display panel 10B of the second embodiment, the extending direction of the second slit aperture 30B is inclined to the scan line 18. Thus, the inclination angles of the extending direction of the first sub-slit aperture 38 and the extending direction of the second sub-slit aperture 39 to the direction of the rubbing treatment are +α1 and −α1, respectively, which have no relation to α3. Therefore, the inclination angle α3 can be set to the optimum angle in the range of 0.1° to 5°. Also in this liquid crystal display panel 10B of the second embodiment, the rotational direction of liquid crystal molecules at the center part of the second slit aperture 30B of the viewing angle control sub-pixel 17B is settled, and thus light leakage hardly occurs.

Furthermore, as shown in FIG. 4, the edge lines of the slit end parts of the second slit aperture 30B are not parallel to the direction RB of the rubbing treatment but inclined by β2. Therefore, liquid crystal molecules rotate in the same direction also at the center part of the edge line of the slit end part. Thus, disclination hardly occurs and light leakage hardly occurs.

In the liquid crystal display panel 10B of the second embodiment, the direction RB of the rubbing treatment is parallel to the signal line 19, and the slits having a bent shape are provided. However, the present application can be applied to a liquid crystal display panel in which the direction of the rubbing treatment is parallel to the scan line 18 and a one-domain liquid crystal display panel, and the optimum rubbing treatment direction for the display sub-pixel can be kept by inclining the extending direction of the slit aperture of the viewing angle control sub-pixel to the scan line or the signal line.

Third Embodiment

Figure 6:
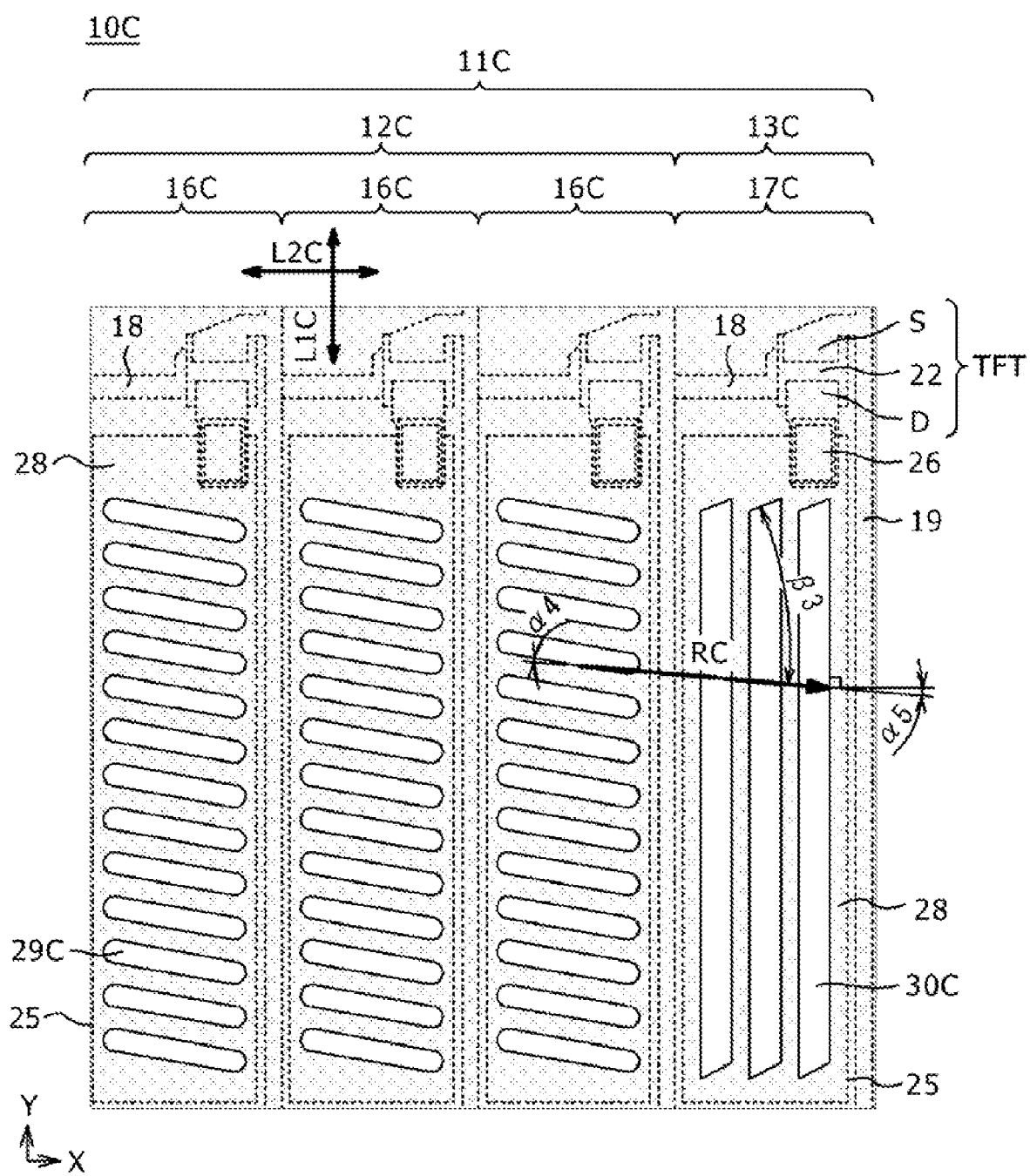
FIG. 6 is a plan view showing the outline of an array substrate corresponding to one pixel in a third embodiment.
Figure 7A:
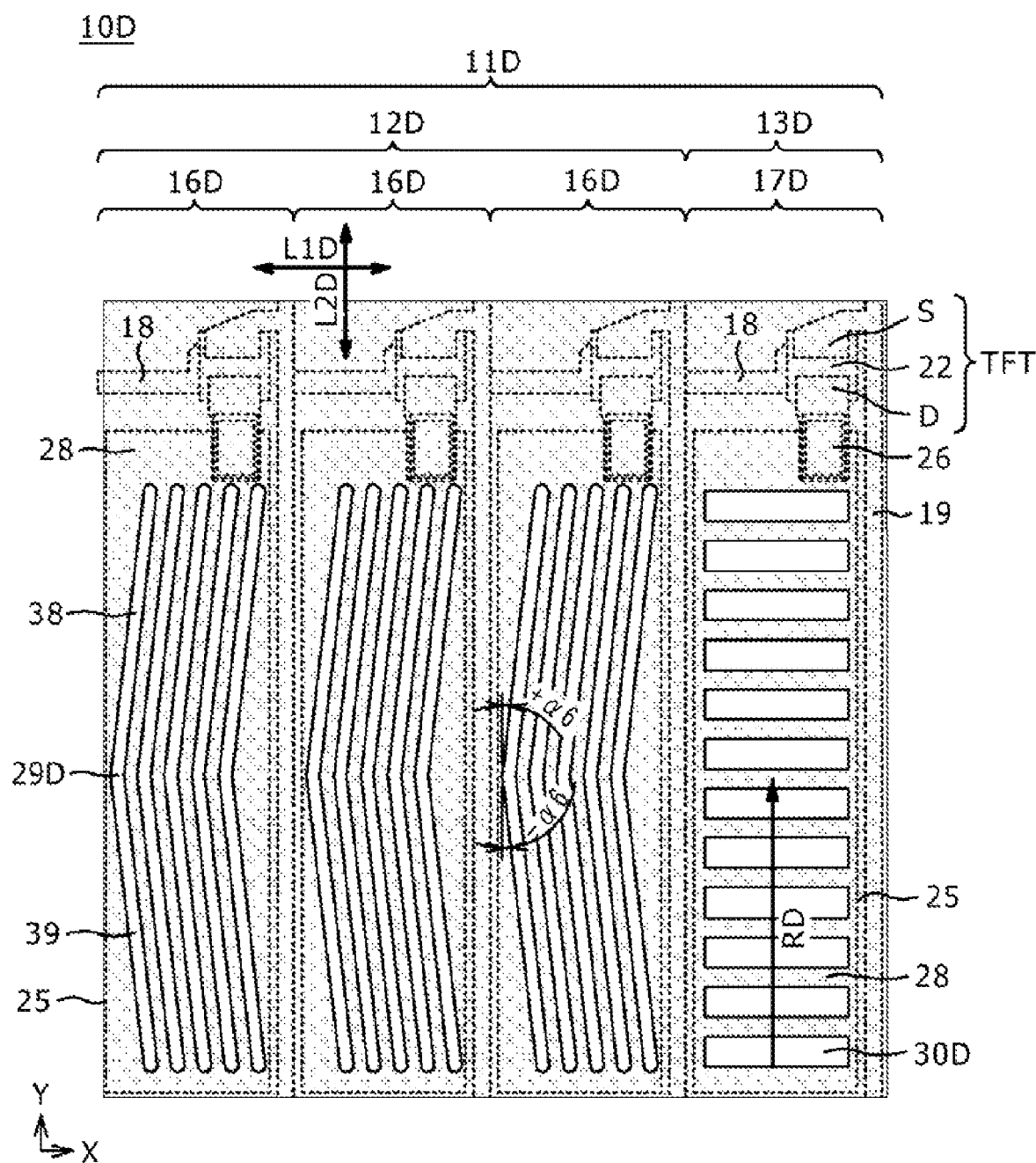
FIG. 7A is a plan view showing the outline of an array substrate corresponding to one pixel in related arts.
Figure 7B:
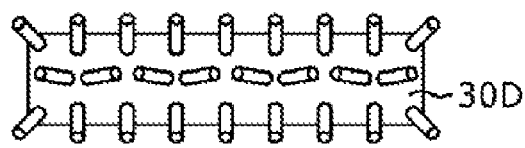
FIG. 7B is a plan view showing the alignment of liquid crystal molecules in a slit aperture of a viewing angle control sub-pixel in the related arts.

A liquid crystal display panel 10C of a third embodiment will be described below with use of FIG. 6. In FIG. 6, diagrammatic representation of the first alignment film is omitted. FIG. 6 corresponds to FIG. 1 for the liquid crystal display panel 10A of the first embodiment. For the liquid crystal display panel 10C of the third embodiment, the part having the same configuration as that of the part in the liquid crystal display panel 10A of the first embodiment is given the same reference numeral, and the alphabet is changed to "C" for the reference numeral having the alphabet. Detailed description of these parts is omitted.

Main differences in the configuration between the liquid crystal display panel 10C of the third embodiment and the liquid crystal display panel 10A of the first embodiment are as follows. Specifically, the number of kinds of the extending direction of the slit aperture 29C is one in the liquid crystal display panel 10C of the third embodiment in contrast to the liquid crystal display panel 10A of the first embodiment, in which the number of kinds of the extending direction of the slit aperture 29A in the display area 12A is two. In addition, the extending direction of the second slit aperture 30C of the viewing angle control sub-pixel 17C is parallel to the signal line 19 in the liquid crystal display panel 10C of the third embodiment in contrast to the liquid crystal display panel 10A of the first embodiment, in which the extending direction of the second slit aperture 30A of the viewing angle control sub-pixel 17A is parallel to the scan line 18.

As shown in FIG. 6, in the liquid crystal display panel 10C of the third embodiment, the first slit aperture 29C of the display sub-pixel 16C has not a bent shape but a straight line shape that is diagonally right down slightly. The direction RC of the rubbing treatment for the first alignment film 32 is diagonally right down with a slope gentler than that of the first slit aperture 29C. The extending direction of the first slit aperture 29C is inclined to the direction RC of the rubbing treatment for the first alignment film 32 by α4. The extending direction of the second slit aperture 30C of the viewing angle control sub-pixel 17C is set parallel to the signal line 19. The direction RC of the rubbing treatment for the first alignment film 32 is inclined to the perpendicular line to the extending direction of the second slit aperture 30C by α5. α4 and α5 can be each set to the optimum value in the range of 0.1° to 5° similarly to the second embodiment. Also in the liquid crystal display panel 10C of the third embodiment, the rotational direction of liquid crystal molecules at the center part of the second slit aperture 30C of the viewing angle control sub-pixel 17C is settled, and thus light leakage hardly occurs.

Furthermore, as shown in FIG. 6, the edge lines of the slit end parts of the second slit aperture 30C are not parallel to the direction RC of the rubbing treatment but inclined by β3. Therefore, liquid crystal molecules rotate in the same direction also at the center part of the edge line of the slit end part. Thus, disclination hardly occurs and light leakage hardly occurs.

As just described, the present application can be effectively applied also to a liquid crystal display panel that does not have a multi-domain structure and a liquid crystal display panel in which the extending direction of the slit aperture of the viewing angle control sub-pixel is parallel to the signal line. For the liquid crystal display panels 10A to 10C of the above-described first to third embodiments, an example is shown in which the interlayer resin film 24 is formed in order to planarize the uneven surface of the passivation film 23 due to the signal line 19, the thin film transistor TFT, and the gate insulating film 21. However, the present application can be applied also to an FFS-mode liquid crystal display panel including no interlayer resin film.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The invention claimed is:
1. A liquid crystal display panel comprising:
   first substrate and second substrate configured to sandwich a liquid crystal layer and be disposed opposed to each other, a display sub-pixel and a viewing angle control sub-pixel being formed in the first substrate and the second substrate;

a first polarizer configured to be provided on an outer surface side of the first substrate; and a second polarizer configured to be provided on an outer surface side of the second substrate and have an optical axis perpendicular to an optical axis of the first polarizer, wherein in the first substrate, for both the display sub-pixel and the viewing angle control sub-pixel, a lower electrode, an upper electrode that is formed with intermediary of an insulating layer between the upper electrode and the lower electrode and has a plurality of slit apertures, and a first alignment film that is formed on a surface of the upper electrode and in the slit apertures and is subjected to rubbing treatment parallel or perpendicular to the optical axis of the first polarizer are formed, in the second substrate, a second alignment film subjected to rubbing treatment parallel or perpendicular to the optical axis of the first polarizer is formed, and direction of the rubbing treatment for the first alignment film is inclined to at least one of a perpendicular line to extending direction of the slit aperture of the viewing angle control sub-pixel and an edge line of a slit end part of the slit aperture of the viewing angle control sub-pixel.

2. The liquid crystal display panel according to claim 1, wherein the direction of the rubbing treatment for the first alignment film is inclined to the perpendicular line to the extending direction of the slit aperture of the viewing angle control sub-pixel by 0.1° to 5°.

3. The liquid crystal display panel according to claim 1, wherein the plurality of slit apertures of the display sub-pixel have a vertical bent shape along a signal line.

4. The liquid crystal display panel according to claim 1, wherein the direction of the rubbing treatment for the first alignment film is parallel to a signal line or a scan line.

5. The liquid crystal display panel according to claim 1, wherein the plurality of slit apertures of the display sub-pixel are extended along a lateral direction with an inclination to a scan line in one direction, and the plurality of slit apertures of the viewing angle control sub-pixel are extended along a vertical direction in parallel to extending direction of a signal line.

* * * * *